(12) United States Patent
Awaji et al.

(10) Patent No.: US 8,877,134 B2
(45) Date of Patent: Nov. 4, 2014

(54) EXHAUST GAS TREATING SYSTEM (75) Inventors: Toshio Awaji, Sakai (JP); Takashi Nakayama, Sakai (JP)

(73) Assignee: Clean Technology Co., Ltd., Izumisano-Shi Osaka Pref. (JP)

( * ) Notice: Subject to any disclaimer, the term of this patent is extended or adjusted under 35 U.S.C. 154(b) by 1857 days.

(21) Appl. No.: 12/068,302

(22) Filed: Feb. 5, 2008

(65) Prior Publication Data
US 2008/0190762 A1  Aug. 14, 2008

(30) Foreign Application Priority Data

Feb. 8, 2007  (JP) ................. 2007-029175

(51) Int. Cl.
*B01J 19/08* (2006.01)
*B01D 53/70* (2006.01)
*H05H 1/24* (2006.01)
*B01D 53/32* (2006.01)

(52) U.S. Cl.
CPC .......... *B01D 53/32* (2013.01); *B01D 2257/204* (2013.01); *B01D 2251/206* (2013.01); *B01D 2257/2066* (2013.01); *B01D 2251/404* (2013.01); *B01D 53/70* (2013.01); *B01D 2259/818* (2013.01); *B01D 2251/304* (2013.01); *H05H 1/24* (2013.01); *B01D 2251/604* (2013.01); *B01D 2251/402* (2013.01); *Y10S 422/906* (2013.01)

USPC .................................... 422/186.03; 422/906

(58) Field of Classification Search
CPC ..................................... B01J 19/088
USPC ................. 422/186, 906, 907; 588/301, 306; 204/157.15

See application file for complete search history.

(56) References Cited

U.S. PATENT DOCUMENTS 4,466,824 A * 8/1984 Gauvin et al. .................. 373/22
5,866,753 A * 2/1999 Deam et al. ................... 588/311

* cited by examiner

*Primary Examiner* — Natalia Levkovich
(74) *Attorney, Agent, or Firm* — Wenderoth, Lind & Ponack, L.L.P.

(57) ABSTRACT

The present invention, aiming at providing an exhaust gas treating system capable of increasing the exhaust gas treating volume, through increase of the diameter of the reaction tube, stabilizing the state of generation of plasma without requiring any water membrane, and improving the harmful matters removing performance by extending the plasma length, comprises a reaction tube 1 for introducing exhaust gas G, an upper electrode 2 disposed in the air on the top side of the reaction tube 1, a lower electrode 3 disposed on the bottom side of the reaction tube 1, and a spray nozzle 4 for spraying an electrolytic solution D between the upper electrode 2 and the lower electrode 3, so as to form a path of electric current between the electrodes 2, 3 and generate plasma P in the reaction tube 1, by spraying an electrolytic solution D between the upper electrode 2 and the lower electrode 3.

15 Claims, 6 Drawing Sheets

EXHAUST GAS TREATING SYSTEM

BACKGROUND OF THE INVENTION

The present invention concerns a treating system of exhaust gas such as PFC gas, etc., more specifically an exhaust gas treating system for decomposing and treating harmful matters contained in the exhaust gas by means of plasma generated between electrodes.

Conventionally, proposal is made of exhaust gas treating systems for decomposing and treating harmful matters contained in the exhaust gas means of plasma generated between electrodes (for example, Japanese Laid-open Patent Publication No. H5-15737 (patent literature 1), Japanese Laid-open Patent Publication No. H7-47224 (patent literature 2), Japanese Laid-open Patent Publication No. H11-156156 (patent literature 3), and Japanese Laid-open Patent Publication No. 2004-209373 (patent literature 4)).

Of those inventions, the exhaust gas treating system described in the patent literature 4 comprises a reaction tube in the shape of a slender pipe through which to pass the gas to be treated, a high-tension electrode disposed on the top side of this reaction tube, a grounding electrode on the bottom side of this reaction tube, a feed water pipe for feeding water into said reaction tube from the top side of the reaction tube, an exhaust pipe for discharging the water in the reaction tube from the bottom side of the reaction tube, and a nozzle for feeding electrolytic solution into the reaction tube from the top side of the reaction tube, wherein the plasma is generated in the axial direction of the reaction tube, thereby enabling to decompose and treat harmful matters contained in the exhaust gas more efficiently compared with the exhaust gas treating systems described in the patent literatures 1~3.

By the way, in this exhaust gas treating system described in the patent literature 4, the generation of plasma is made by forming a water membrane on the inner side of the reaction tube, and flowing an electrolytic solution there.

However, according to such construction, the electrodes must inevitably be disposed in the vicinity of the reaction tube, and this makes it impossible to increase the diameter of the reaction tube to beyond a certain level, thus presenting a problem of limited exhaust gas treating volume.

Moreover, with conventional exhaust gas treating systems, in which a water membrane is formed in the reaction tube, the state of generation of plasma becomes unstable because of shaking of the water wall, making it impossible to extend the distance between electrodes (plasma length) to beyond a certain level, and thereby further limiting the harmful matters removing performance.

SUMMARY OF THE INVENTION

The objective of the present invention, realized in view of the above-described problems of conventional exhaust gas treating systems, is to provide an exhaust gas treating system capable of increasing the exhaust gas treating volume, by increasing the diameter of the reaction tube, stabilizing the state of generation of plasma without requiring any water membrane, and improving the harm removing performance by extending the plasma length.

To achieve said objective, the exhaust gas treating system according to the present invention is an exhaust gas treating system for decomposing and treating harmful matters contained in the exhaust gas by means of plasma generated in the reaction tube, characterized in that it comprises an upper electrode disposed in the air on the top side of the reaction tube, a lower electrode disposed on the bottom side of the reaction tube, and a spray nozzle for spraying an electrolytic solution between the upper electrode and the lower electrode.

In this case, an electrode of the following construction may be adopted for the upper electrode:

(1) An upper electrode realized in a way to also serves as spray nozzle for spraying an electrolytic solution.

(2) An upper electrode realized in such a way that a cooling water can flow through the inside of the upper electrode.

(3) An upper electrode realized in such a way that water for cooling and protection against corrosion is sprayed on the outside of the upper electrode.

(4) An upper electrode realized in such a way that a shield gas for cooling and protection against corrosion flows on the outside of the upper electrode.

Moreover, an electrode of the following construction may be adopted for the lower electrode:

(5) A lower electrode formed in the shape of a nozzle for spraying water for cooling and protection against corrosion.

(6) A lower electrode formed in a shape allowing overflowing of the water for cooling and protection against corrosion.

(7) A lower electrode realized in such a way that a cooling water can flow through the inside of the lower electrode.

(8) A lower electrode realized in such a way that water for cooling and protection against corrosion is sprayed on the outside of the lower electrode.

(9) A lower electrode realized in a way to be immersed in a water tank.

Furthermore, around the reaction tube may be provided a water-cooling jacket for cooling the reaction tube at the time of generation of plasma, and cleaning the reaction tube by overflowing cooling water in it when the plasma is at stop.

Still more, around the reaction tube may be provided a spray nozzle for spraying water used for cooling the reaction tube and for cleaning and cooling the exhaust gas at the time of generation of plasma.

According to the exhaust gas treating system of the present invention, which is an exhaust gas treating system for decomposing and treating an exhaust gas introduced into the reaction tube, comprising an upper electrode disposed in the air on the top side of the reaction tube, a lower electrode disposed on the bottom side of the reaction tube, and a spray nozzle for spraying an electrolytic solution between the upper electrode and the lower electrode, it is possible to form a path of electric current between the electrodes and generate plasma in the reaction tube, by spraying an electrolytic solution between the upper electrode and the lower electrode.

And, with the exhaust gas treating system of the present invention, which does not require any water membrane in the reaction tube unlike any conventional system, it becomes possible to increase the diameter of the reaction tube, regardless of its positional relation with the electrodes, thereby enabling to increase the treated volume of the exhaust gas, stabilize the state of generation of plasma, and to also improve the harmful matters removing performance through extension of the plasma length.

Moreover, by adopting an electrode of the constructions (1)~(4) above for the upper electrode, it becomes possible to efficiently cool and protect against corrosion the upper electrode exposed to high temperature, prevent consumption of the upper electrode, and clean and cool the exhaust gas as scrubber.

Furthermore, by adopting an electrode of the constructions (5)~(9) above for the lower electrode, it becomes possible to efficiently cool and protect against corrosion the lower electrode exposed to high temperature, prevent consumption of the upper electrode, and clean and cool the exhaust gas as scrubber.

Still more, by providing, around the reaction tube, a water-cooling jacket for cooling the reaction tube at the time of generation of plasma, and cleaning the reaction tube by overflowing cooling water in it when the plasma is at stop, it becomes possible to cool the reaction tube at the time of generation of plasma and clean the inside of the reaction tube when the plasma is at stop.

Yet more, by providing, around the reaction tube, a spray nozzle for spraying water used for cooling the reaction tube and for cleaning and cooling the exhaust gas at the time of generation of plasma, it becomes possible to cool the reaction tube and clean and cool the exhaust gas at the time of generation of plasma.

DETAILED DESCRIPTION OF THE INVENTION

Embodiments of the exhaust gas treating system according to the present invention will be explained below, based on drawings.

Embodiment 1

Figure 1:
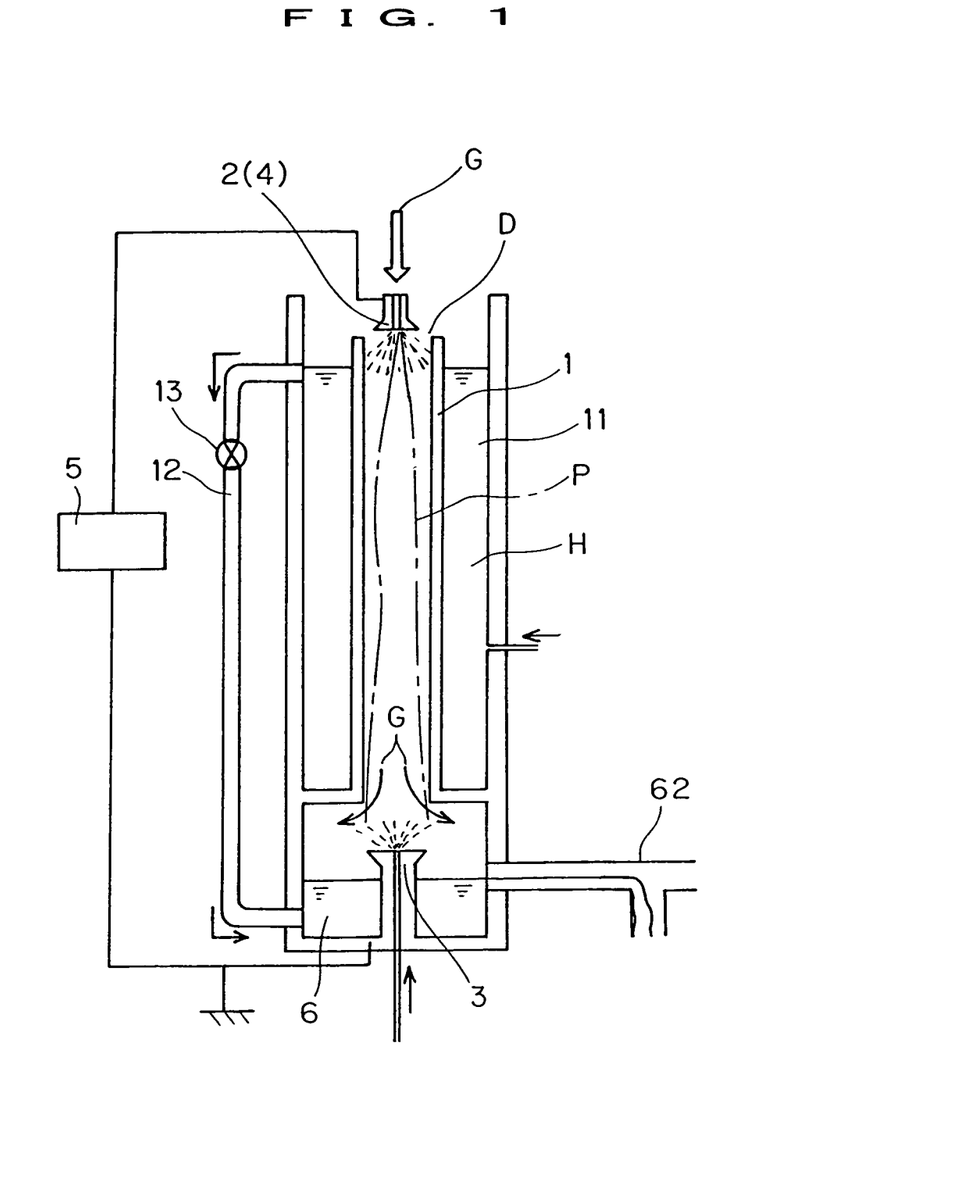
FIG. 1 is a sectional view showing the first embodiment of the exhaust gas treating system according to the present invention.

FIG. 1 shows the first embodiment of the exhaust gas treating system according to the present invention.

This exhaust gas treating system is intended for decomposing and treating harmful matters contained in the exhaust gas such as PFC gas as represented by $CF_4$, $SF_6$, etc., for example, by means of plasma generated between electrodes under the atmospheric pressure.

And, this exhaust gas treating system comprises a reaction tube 1 for introducing exhaust gas G, an upper electrode 2 disposed in the air on the top side of the reaction tube 1, a lower electrode 3 disposed on the bottom side of the reaction tube 1, and a spray nozzle 4 for spraying an electrolytic solution D between the upper electrode 2 and the lower electrode 3 (in this embodiment, the upper electrode 2 is designed to also serve as spray nozzle 4 for spraying an electrolytic solution), so as to form a path of electric current between the electrodes 2, 3 and generate plasma P in the reaction tube 1, by spraying an electrolytic solution D between the upper electrode 2 and the lower electrode 3.

The reaction tube 1, realized in the form of a vertically installed cylinder, is composed of alumina, mullite, quartz, ceramics such as zirconia, etc. and other heat-resistant materials.

Although the reaction tube 1 may also be of air-cooled type, around the reaction tube is provided, in this embodiment, a water-cooling jacket 11 for cooling the reaction tube 1 at the time of generation of plasma, and cleaning the reaction tube 1 by overflowing water H in it when the plasma is at stop.

The water H of the water-cooling jacket 11 is introduced, at the time of generation of plasma, from the bottom part of the water-cooling jacket 11, flows from an overflow line 12 into a water tank 6, and is discharged from an overflow line 62. As water H, one may either use fresh water or circulate waste water.

Furthermore, when the plasma is at stop, a valve 13 of the overflow line 12 is closed, to clean the inside of the reaction tube 1 by overflowing the water H there.

The exhaust gas G is introduced through an opening at the top of the reaction tube 1 and, after harmful matters are decomposed by the plasma P, discharged through an opening at the bottom of the reaction tube 1.

The upper electrode 2, composed of a conductive material such as stainless steel, Hastelloy, tungsten, SiC, etc., is disposed in the air at the upper opening of the reaction tube 1, and a high-voltage current is applied to it from a power supply unit 5. And, the upper electrode 2 and the lower electrode 3 may be either positive and negative respectively or otherwise.

In this case, an electrode of the following construction may be adopted for the upper electrode 2:

(1) The upper electrode 2 is realized in a way to also serve as spray nozzle 4 for spraying an electrolytic solution (first embodiment).

Figure 2:
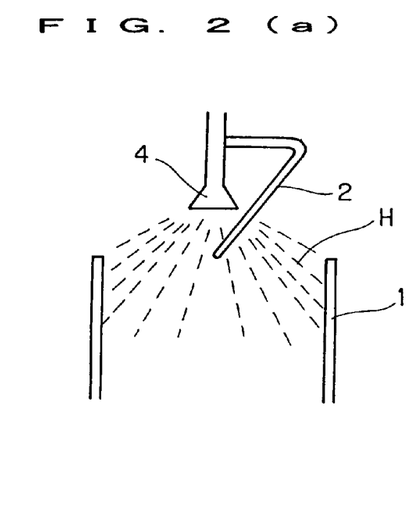
FIG. 2 is a sectional view showing a modified embodiment of the upper electrode.

(1') The upper electrode 2 and the spray nozzle 4 for spraying an electrolytic solution are disposed individually (FIG. 2 (a)).

(2) A cooling water H can flow through the inside of the upper electrode 2 (FIG. 2 (b)).

(3) A spray nozzle 4A for spraying water for cooling and protection against corrosion is provided on the outside of the upper electrode 2 (FIG. 2 (c)).

(4) A shield gas (inert gas) Ga for cooling and protection against corrosion flows on the outside of the upper electrode 2 (FIG. 2 (d)).

This enables to efficiently cool and protect against corrosion the upper electrode 2 exposed to high temperature, prevent consumption of the upper electrode 2, and use the sprayed water H intended for cooling and protection against corrosion also for such purposes as cooling and dissolution of exhaust gas G, removal of powder, etc., as scrubber.

The lower electrode 3, composed of a conductive material such as stainless steel, Hastelloy, tungsten, SiC, etc., is formed below the reaction tube 1 in a way to also serve as scrubber nozzle for spraying water for cooling and protection against corrosion.

The water H for cooling and protection against corrosion sprayed by the lower electrode 3 is discharged from the water tank 6 through the overflow line 62. As water H for cooling and protection against corrosion, one may either use fresh water or circulate waste water, or use a chemical solution such ammoniac water, etc.

In this case, an electrode of the following construction may be adopted for the lower electrode 3:

(5) A lower electrode 3 formed in the shape of a nozzle for spraying water for cooling and protection against corrosion (first embodiment).

Figure 3:
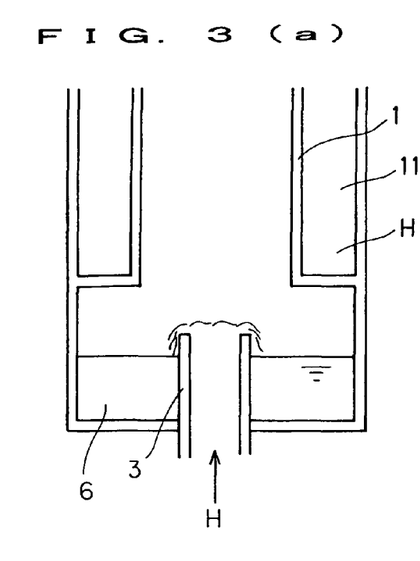
FIG. 3 is a sectional view showing a modified embodiment of the lower electrode.

(6) A lower electrode 3 formed in a shape allowing overflowing of the water for cooling and protection against corrosion H (FIG. 3 (a)).

(7) A lower electrode 3 realized in such a way that cooling water H can flow through the inside of the lower electrode 3 (FIG. 3 (b)).

(8) A lower electrode 3 provided, around the reaction tube, with a scrubber nozzle 64 for spraying water used for cooling and protection against corrosion is provided on the outside of the lower electrode 3 (FIG. 3 (c)).

(9) The lower electrode 3 realized in a way to be immersed in a water tank 6 (FIG. 3 (d)).

This enables to efficiently cool and protect against corrosion the lower electrode 3 exposed to high temperature, prevent consumption of the lower electrode 3, and use the sprayed water H intended for cooling and protection against corrosion also for such purposes as cooling and dissolution of the exhaust gas G, removal of powder, etc., as scrubber.

In the first embodiment, the spray nozzle 4 also discharging the function of the upper electrode 2, disposed at the upper opening of the reaction tube 1, sprays an electrolytic solution D between the upper electrode 2 and the lower electrode 3.

The spraying of electrolytic solution D enables to form a path of electric current between the upper electrode 2 and the lower electrode 3, thereby facilitating generation of plasma P.

As electrolytic solution D, one may use a solution in which is dissolved an electrolytic substance such as NaCl, $CaCl_2$, $MgCl_2$, $NH_4Cl$, NaOH, etc. and, especially, use of an alkaline electrolytic solution enables to neutralize acidic exhaust gases.

Embodiment 2

Figure 4:
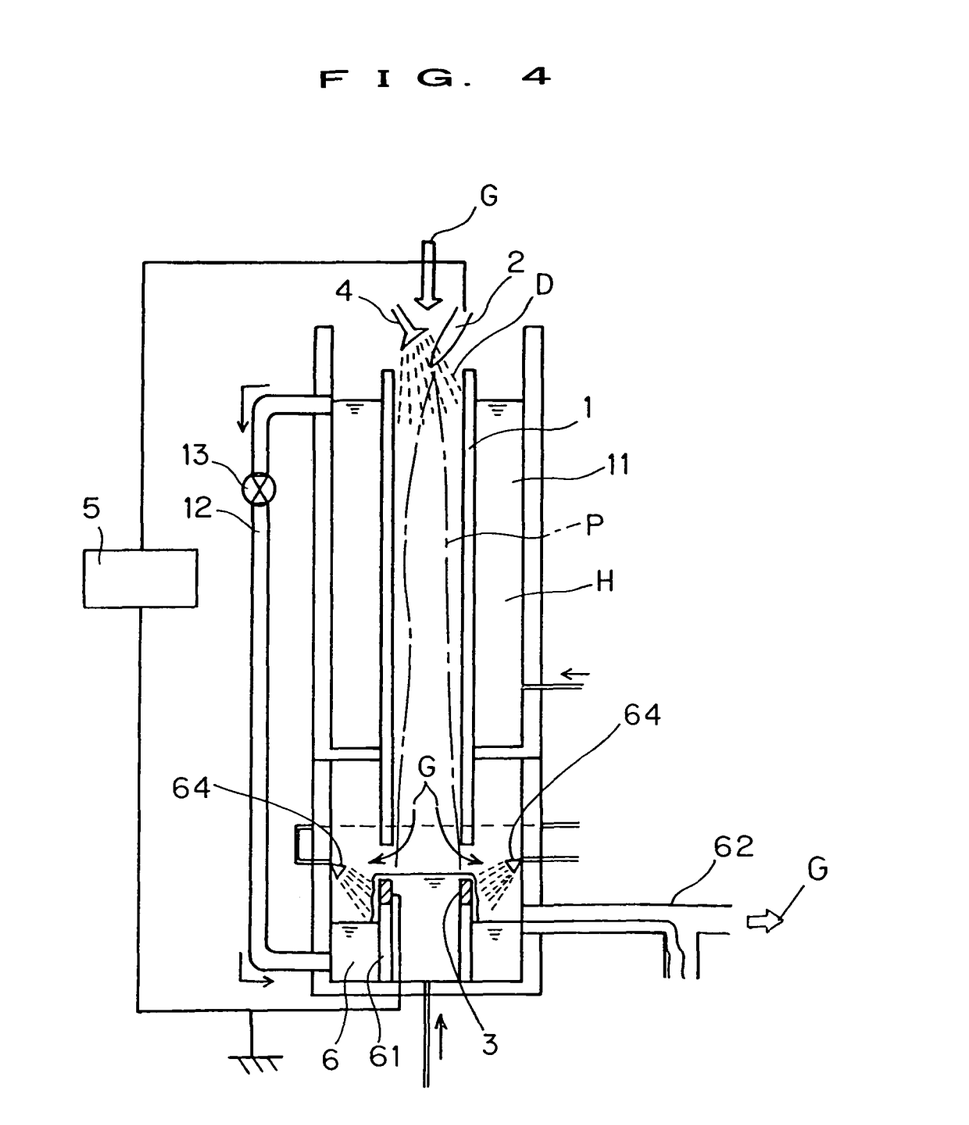
FIG. 4 is a sectional view showing the second embodiment of the exhaust gas treating system according to the present invention.

FIG. 4 shows the second embodiment of the exhaust gas treating system according to the present invention.

This exhaust gas treating system comprises a reaction tube 1 for introducing exhaust gas G, an upper electrode 2 disposed in the air on the top side of the reaction tube 1, a lower electrode 3 disposed on the bottom side of the reaction tube 1, and a spray nozzle 4 for spraying an electrolytic solution D between the upper electrode 2 and the lower electrode 3, so as to form a path of electric current between the electrodes 2, 3 and generate plasma P in the reaction tube 1.

The reaction tube 1, realized in the form of a vertically installed cylinder, is composed of alumina, mullite, quartz, ceramics such as zirconia, etc. and other heat-resistant materials.

Although the reaction tube 1 may also be of air-cooled type, around the reaction tube is provided, in this embodiment, a water-cooling jacket 11 for cooling the reaction tube 1 at the time of generation of plasma, and cleaning the reaction tube 1 by overflowing water H in it when the plasma is at stop.

The water H for cooling the water-cooling jacket 11 is introduced, at the time of generation of plasma, from the bottom part of the water-cooling jacket 11, flows from an overflow line 12 into a water tank 6, and is discharged from an overflow line 62. As water H, one may either use fresh water or circulate waste water.

Furthermore, when the plasma is at stop, a valve 13 of the overflow line 12 is closed, to clean the inside of the reaction tube 1 by overflowing the water H there.

The exhaust gas G is introduced through an opening at the top of the reaction tube 1 and, after harmful matters are decomposed by the plasma P, discharged through an opening at the bottom of the reaction tube 1.

The upper electrode 2, composed of a conductive material such as stainless steel, Hastelloy, tungsten, SiC, etc., is disposed in the air at the upper opening of the reaction tube 1, and a high-voltage current is applied to it from a power supply unit 5. In this case, the upper electrode 2 and the lower electrode 3 may be either positive and negative respectively or otherwise.

This spraying of water H for cooling and protection against corrosion may also be used for such purposes as cooling and dissolution of exhaust gas G, removal of powder, etc.

The lower electrode 3, composed of a conductive material such as stainless steel, Hastelloy, tungsten, SiC, etc., is formed, below the reaction tube 1, in a shape allowing overflowing of the water H for cooling and protection against corrosion or, in the present embodiment, in a short cylindrical shape. Any shape may be adopted as shape of the lower electrode 3, if only it enables overflowing of the water H for cooling and protection against corrosion, and the shape may be set as desired such as a thick and short cylindrical shape, etc. for securing durability, for example (the same is true also with the third embodiment described later).

The lower electrode 3, supported by a cylindrical support 61 at the top of the water tank 6 provided under the reaction tube 1, is designed in such a way that the water H for cooling and protection against corrosion may overflow from this lower electrode 3.

The water H for cooling and protection against corrosion which overflowed from this lower electrode 3 is discharged from the water tank 6 through an overflow line 62. As water H for cooling and protection against corrosion, one may either use fresh water or circulate waste water.

In addition, in the present embodiment, a scrubber nozzle 64 is provided around the lower electrode 3.

The spray nozzle 4, disposed at the upper opening of the reaction tube 1, sprays an electrolytic solution D between the upper electrode 2 and the lower electrode 3.

This spraying of electrolytic solution D by the spray nozzle 4 may be either stopped or continued after the ignition of the plasma P.

The spraying of electrolytic solution D enables to form a path of electric current between the upper electrode 2 and the lower electrode 3, thereby facilitating generation of plasma P.

As electrolytic solution D, one may use a solution in which is dissolved an electrolytic substance such as NaCl, $CaCl_2$, $MgCl_2$, $NH_4Cl$, NaOH, etc. and, especially, use of an alkaline electrolytic solution enables to neutralize acidic exhaust gases.

Embodiment 3

Figure 5:
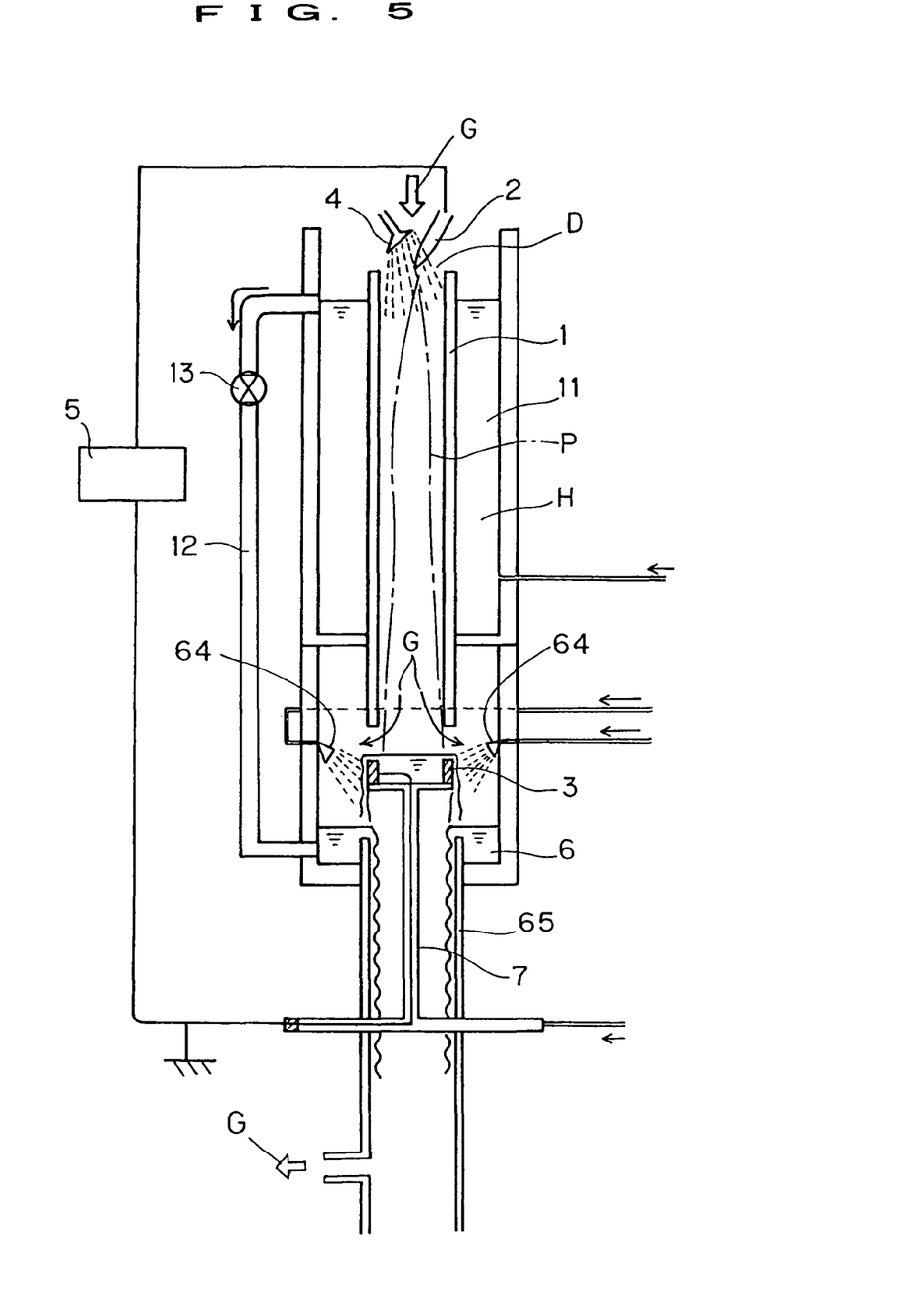
FIG. 5 is a sectional view showing the third embodiment of the exhaust gas treating system according to the present invention.

FIG. 5 shows the third embodiment of the exhaust gas treating system according to the present invention.

This exhaust gas treating system, having the lower electrode 3 formed in a bottomed cylindrical shape, is designed to support this lower electrode 3 with a feed-water pipe 7.

The water H in the water tank 6 is discharged from an overflow line 65 provided at the center of the tank.

Other constructions of this third embodiment are the same as those of the respective embodiments described above and, therefore, one same signs and numerals will be given to one same members, and the explanation thereof will be omitted.

Embodiment 4

Figure 6:
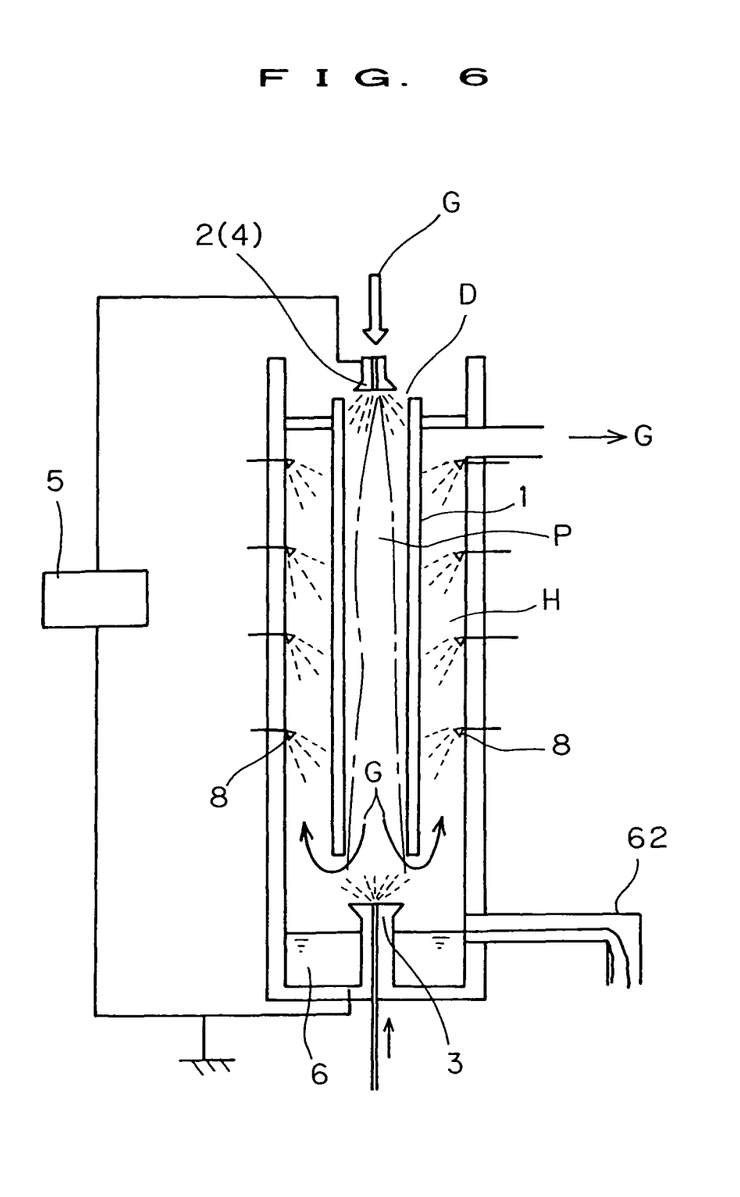
FIG. 6 is a sectional view showing the fourth embodiment of the exhaust gas treating system according to the present invention.

FIG. 6 shows the fourth embodiment of the exhaust gas treating system according to the present invention.

This exhaust gas treating system is provided, around the reaction tube 1, with a spray nozzle 8 for spraying water for cooling the reaction tube 1 as well as cleaning and cooling the exhaust gas, at the time of generation of plasma.

Other constructions of this fourth embodiment are the same as those of the respective embodiments described above and, therefore, one same signs and numerals will be given to one same members, and the explanation thereof will be omitted.

As described above, the exhaust gas treating system according to the present embodiment is an exhaust gas treating system for decomposing and treating exhaust gas G, introduced into the reaction tube 1, by means of plasma P generated in the reaction tube 1, comprising an upper electrode 2 disposed in the air on the top side of the reaction tube 1, a lower electrode 3 disposed on the bottom side of the reaction tube 1, and a spray nozzle 4 for spraying an electrolytic solution D between the upper electrode 2 and the lower electrode 3 and, because of such construction, it enables to generate plasma P in the reaction tube 1 by forming a path of electric current between the electrode 2 and the electrode 3 with spraying of an electrolytic solution D between the upper electrode 2 and the lower electrode 3.

And, with the exhaust gas treating system according to the present invention, which does not require any water membrane in the reaction tube 1 unlike any conventional system, it becomes possible to increase the diameter of the reaction tube 1, regardless of its positional relation with the electrodes, thereby allowing to increase the treated volume of the exhaust gas, stabilize the state of generation of plasma, and to also improve the harmful matters removing performance through extension of the plasma length.

Furthermore, by providing, around the reaction tube 1, a water-cooling jacket 11 for cooling the reaction tube 1 at the time of generation of plasma, and cleaning the reaction tube 1 by overflowing cooling water H in it when the plasma is at stop, it becomes possible to cool the reaction tube 1 at the time of generation of plasma and clean the inside of the reaction tube 1 when the plasma is at stop.

Still more, by providing, around the reaction tube 1, a spray nozzle 8 for spraying water H used for cooling the reaction tube 1 and for cleaning and cooling the exhaust gas at the time of generation of plasma, it becomes possible to cool the reaction tube and clean and cool the exhaust gas at the time of generation of plasma.

Explanation has so far been made on the exhaust gas treating system according to the present invention, based on embodiments thereof. However, the present invention is not restricted to the constructions described in those embodiments, but its construction may be modified as desired within the scope not deviating from the main purpose of the invention, by such ways as combining the constructions described in the embodiments as required, etc.

INDUSTRIAL APPLICABILITY

The exhaust gas treating system according to the present invention has characteristics of enabling to increase the exhaust gas treating volume, through increase of the diameter of the reaction tube, stabilizing the state of generation of plasma without requiring any water membrane, and improving the harmful matters removing performance by extending the plasma length. For that reason, this system can be used widely and suitably as exhaust gas treating system for treating exhaust gas either in a large volume or rapidly.

The invention claimed is:

1. An exhaust gas treating system for decomposing and treating harmful matter contained in the exhaust gas by means of plasma generated in a reaction tube, the exhaust gas treating system comprising:
    an upper electrode disposed on a top side of the reaction tube;
    a lower electrode disposed on a bottom side of the reaction tube;
    a first spraying means for spraying an electrolytic solution between the upper electrode and the lower electrode;
    a second spraying means for spraying water on an exterior surface of the upper electrode in order to cool the upper electrode and protect the upper electrode against corrosion; and
    a water tank,
    wherein the upper electrode has a cavity formed therein through which cooling water is able to flow,
    wherein the lower electrode has a cavity formed therein through which cooling water is able to flow, and
    wherein at least a portion of the lower electrode is immersed in the water tank.

2. An exhaust gas treating system as defined in claim 1, wherein the upper electrode is configured so as to also serve as the first spraying means for spraying the electrolytic solution between the upper electrode and the lower electrode.

3. An exhaust gas treating system as defined in claim 1, wherein the upper electrode is arranged such that a shield gas is able to flow on an outside surface of the upper electrode.

4. An exhaust gas treating system as defined in claim 1, wherein the lower electrode is formed in a shape of a nozzle for spraying water for cooling the lower electrode and protecting the lower electrode against corrosion.

5. An exhaust gas treating system as defined in claim 1, further comprising a water-cooling jacket disposed around the reaction tube,
    wherein the water-cooling jacket (i) cools the reaction tube at a time of generation of the plasma and (ii) cleans an inside of the reaction tube by overflowing water from the water-cooling jacket into the reaction tube when the plasma is at a stop.

6. An exhaust gas treating system as defined in claim 1, further comprising a third spraying means for spraying water on an outside surface of the reaction tube so as to cool the reaction tube and to clean and cool the exhaust gas at a time of generation of the plasma, the third spraying means being disposed outside of the reaction tube.

7. An exhaust gas treating system as defined in claim 1, wherein both of the first spraying means and the second spraying means comprise the same one or more spray nozzles.

8. An exhaust gas treating system as defined in claim 1, wherein the first spraying means comprises a first spray nozzle and the second spraying means comprises a second spray nozzle.

9. An exhaust gas treating system as defined in claim 6, wherein the third spraying means comprises one or more spray nozzles.

10. An exhaust gas treating system for decomposing and treating harmful matter contained in the exhaust gas by means of plasma generated in a reaction tube, the exhaust gas treating system comprising:
    an upper electrode disposed on a top side of the reaction tube;
    a lower electrode disposed on a bottom side of the reaction tube;
    a first spraying means for spraying an electrolytic solution between the upper electrode and the lower electrode;
    a second spraying means for spraying water on an exterior surface of the upper electrode in order to cool the upper electrode and protect the upper electrode against corrosion; and a third spraying means for spraying water on an exterior surface of the lower electrode in order to cool the lower electrode and protect the lower electrode against corrosion, wherein the upper electrode has a cavity formed therein through which cooling water is able to flow, and wherein the lower electrode has a cavity formed therein through which cooling water is able to flow.

11. An exhaust gas treating system as defined in claim 10, wherein both of the first spraying means and the second spraying means comprise the same one or more spray nozzles.

12. An exhaust gas treating system as defined in claim 10, wherein the first spraying means comprises a first spray nozzle and the second spraying means comprises a second spray nozzle.

13. An exhaust gas treating system as defined in claim 10, wherein the third spraying means comprises one or more spray nozzles.

14. An exhaust gas treating system as defined in claim 10, wherein the upper electrode is configured so as to also serve as the first spraying means for spraying the electrolytic solution between the upper electrode and the lower electrode.

15. An exhaust gas treating system as defined in claim 10, further comprising a water-cooling jacket disposed around the reaction tube, wherein the water-cooling jacket (i) cools the reaction tube at a time of generation of the plasma and (ii) cleans an inside of the reaction tube by overflowing water from the water-cooling jacket into the reaction tube when the plasma is at a stop.

* * * * *